US009635546B2

(12) United States Patent
Carr

(10) Patent No.: US 9,635,546 B2
(45) Date of Patent: Apr. 25, 2017

(54) LOCKER SERVICE FOR MOBILE DEVICE AND MOBILE APPLICATIONS AUTHENTICATION

(71) Applicant: Verizon Patent and Licensing Inc., Basking Ridge, NJ (US)

(72) Inventor: Forrest L. Carr, Virginia Beach, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 108 days.

(21) Appl. No.: 14/230,985

(22) Filed: Mar. 31, 2014

(65) Prior Publication Data

US 2015/0281950 A1 Oct. 1, 2015

(51) Int. Cl.
*H04M 1/66* (2006.01)
*H04M 1/68* (2006.01)
*H04M 3/00* (2006.01)
*H04W 12/02* (2009.01)
*H04W 12/08* (2009.01)
*H04W 4/02* (2009.01)
*H04L 29/06* (2006.01)
*H04W 12/06* (2009.01)
*H04W 88/02* (2009.01)

(52) U.S. Cl.
CPC ............. *H04W 12/02* (2013.01); *H04W 4/02* (2013.01); *H04W 12/08* (2013.01); *H04L 63/083* (2013.01); *H04L 63/107* (2013.01); *H04W 12/06* (2013.01); *H04W 88/02* (2013.01)

(58) Field of Classification Search
CPC ...... H04W 12/00; H04W 12/02; H04W 12/04; H04W 12/06; H04W 12/08; H04W 12/10; H04W 4/02; H04W 88/02; H04L 63/083; H04L 63/107
USPC .............. 455/410, 411, 418, 419, 456.3, 566
See application file for complete search history.

(56) References Cited

U.S. PATENT DOCUMENTS

| 8,595,810 | B1 * | 11/2013 | Ben Ayed | H04L 63/0815 |
| | | | | 713/168 |
| 9,253,631 | B1 * | 2/2016 | White | H04M 1/72572 |
| 2009/0276831 | A1 * | 11/2009 | Tagashira | 726/3 |
| 2011/0009107 | A1 * | 1/2011 | Guba | G08G 1/20 |
| | | | | 455/418 |
| 2013/0191908 | A1 * | 7/2013 | Klein | 726/18 |
| 2014/0155029 | A1 * | 6/2014 | Kolaks et al. | 455/411 |
| 2014/0283012 | A1 * | 9/2014 | Eggerton et al. | 726/19 |
| 2015/0237187 | A1 * | 8/2015 | Kim | H04M 1/673 |
| | | | | 455/411 |

* cited by examiner

*Primary Examiner* — Olumide T Ajibade Akonai

(57) ABSTRACT

A method, a device, and a non-transitory storage medium to receive a locker setting that indicates at least one of a geographic location of a user device, a state of motion of the user device, or a state of connection of the user device relative to a network or another device; store the locker setting; monitor a current state of the user device, wherein the current state corresponds to a current at least one of geographic location, state of motion, or state of connection of the user device; compare the current state to the locker setting; determine whether to enter a locked state based on a comparison, wherein the locked state requires that a user of the user device re-enters login information; and enter the locked state in response to a determination to enter the locked state, such that the user device and/or an application enters the locked state.

20 Claims, 11 Drawing Sheets

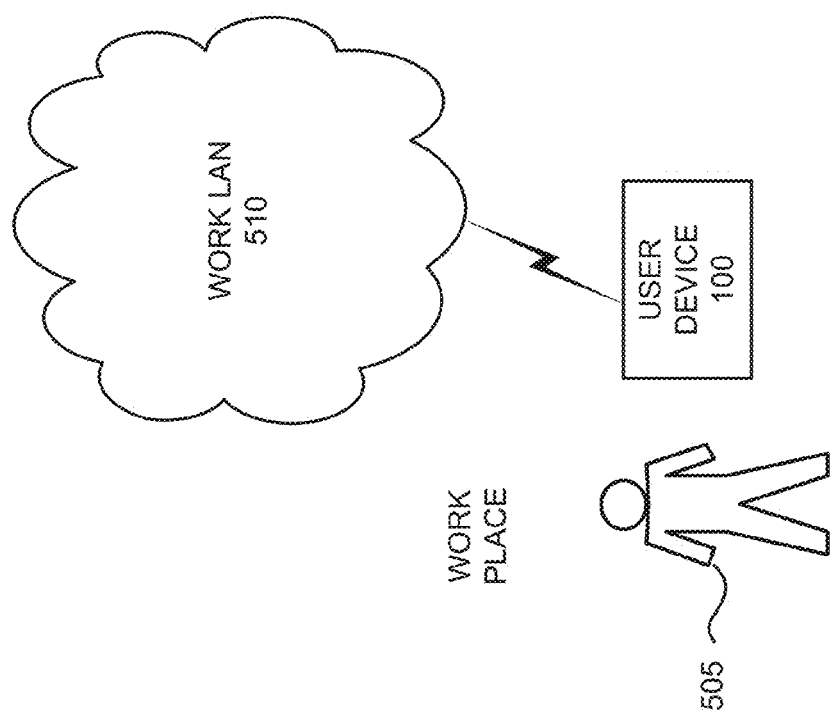

LOCKER SERVICE FOR MOBILE DEVICE AND MOBILE APPLICATIONS AUTHENTICATION

BACKGROUND

Typically, a mobile device or a mobile application enters another state (also known as mode) due to a user's lack of interaction with the mobile device. For example, after a period of time, a tablet device or a mobile application enters into an inactive state (e.g., an auto-lock state), which causes the display of the tablet device to be turned off, the display to lock, the tablet device to lock, or the mobile application to lock. Thereafter, the user may touch a button or the display of the tablet device and be prompted or required to authenticate, log into or unlock the tablet device or the mobile application.

BRIEF DESCRIPTION OF THE DRAWINGS

FIGS. 5A-5C are diagrams illustrating exemplary scenarios pertaining to an exemplary embodiment of the locker tool.

DETAILED DESCRIPTION OF PREFERRED EMBODIMENTS

Figure 1A:
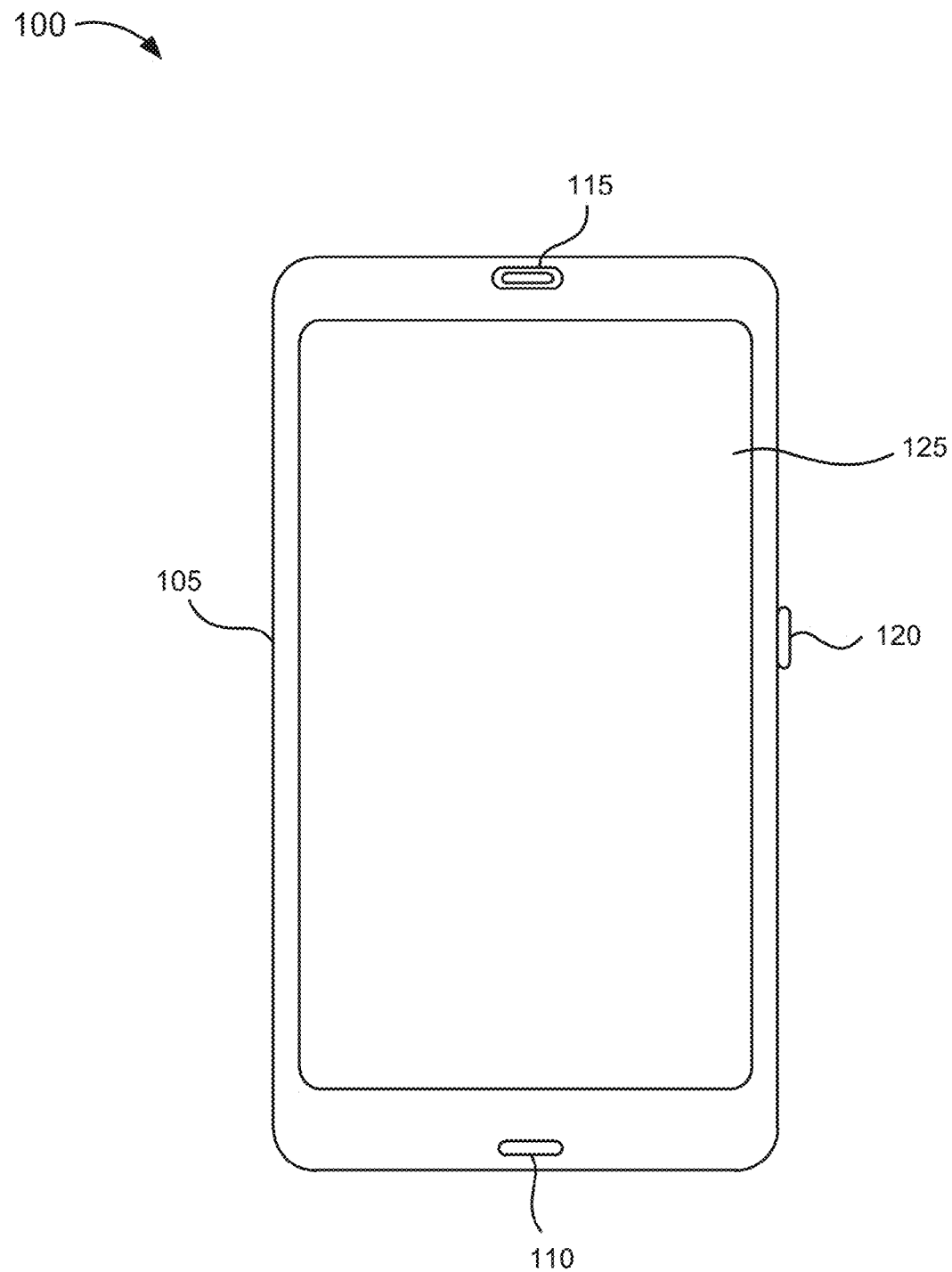
FIG. 1A is a diagram of an exemplary user device in which exemplary embodiments described herein may be implemented.

The following detailed description refers to the accompanying drawings. The same reference numbers in different drawings may identify the same or similar elements. Also, the following detailed description does not limit the invention.

A mobile device allows a user or another person (e.g., an administrator) to set certain device management settings. For the sake of simplicity, the term "user," as used in this description, refers to either type of person. The user may set a time period of inactivity, which at the end of such a time period, causes the mobile device to enter a locked state. For example, a mobile device may include an auto-lock setting in which the user can select a time period (e.g., 2 minutes, 5 minutes, etc.), which at the end of the time period, the mobile device enters an auto-lock state. The auto-lock state may simply correspond to the display of the user device being turned off. Additionally, the user may set a passcode as another setting. When the mobile device is in the auto-locked state, the user may be required to enter the passcode to unlock the mobile device. The mobile device will unlock when the correct passcode is entered.

In addition to or instead of the mobile device, an application (e.g., a mobile application) may prompt the user to log in before the user is allowed to use the application. The application may also enter a locked state or a logged off state after a period of inactivity lapses. When this occurs, the application may prompt the user to re-log in (e.g., enter a passcode).

While the use of a login (e.g., via a passcode lock setting) provides a measure of security to minimize unauthorized use of the mobile device, the mobile device offers a limited number of options to the user pertaining to this feature. That is, the user has a time setting (e.g., a time period of inactivity) and a login setting (e.g., a passcode setting). These two settings may not be sufficient to support the user's needs and/or accommodate various use cases, environments of use of the mobile device, levels of security, etc. Additionally, a mobile application may offer no options to the user or the same or similar options as that of the mobile device regarding the locking and unlocking of the mobile application.

The term "locked state," as used herein, refers to a state of a mobile device or a mobile application in which a login is required to use at least some of the functionalities of the mobile device or the mobile application. For example, the login may be a passcode, a voice command, facial recognition, location of user, voice recognition, fingerprint recognition, retinal, gestural pattern, etc. The login may include a singular or multifactor authentication process.

According to an exemplary embodiment, a mobile device provides one or multiple settings, in addition to the login setting. For purposes of description, the one or multiple settings will be referred to as a locker setting. The locker setting is user configurable. The mobile device may use the locker setting to determine whether the mobile device enters a locked state.

According to an exemplary embodiment, the locker setting pertains to the geographic location of the mobile device. For example, the locker setting may indicate a particular location (e.g., longitude and latitude, home, work, car, etc.), proximity to a location, or proximity to another device. According to another exemplary embodiment, the locker setting pertains to movement of the mobile device. For example, the locker setting may indicate that no movement takes place, a certain degree movement takes place, or no more than a specified duration of movement takes place. According to yet another exemplary embodiment, the locker setting pertains to a communicative link between the mobile device and another device or a network. For example, the locker setting may indicate that the mobile device remain connected to a particular device (e.g., another mobile device, an in-vehicle infotainment device, a Bluetooth device, a wireless device, etc.) and/or network (e.g., a private network in the work place, a wireless local area network (WLAN), etc.).

According to an exemplary embodiment, the locker setting is made available for use by a mobile application. For example, an application may use the locker setting as a parameter that governs a locking and unlocking feature of the application. According to an exemplary embodiment, the mobile device does not enter a locked state, while the mobile application does enter a locked state.

FIG. 1A is a diagram of an exemplary user device 100 in which exemplary embodiments described herein may be implemented. User device 100 may be implemented as a mobile device. For example, the mobile device may take the form of a computer, a smartphone, a personal digital assistant (PDA), a tablet device, a palmtop device, a netbook, a gaming device, a location-aware device, and/or a music playing device.

As illustrated in FIG. 1A, user device 100 comprises a housing 105, a microphone 110, a speaker 115, a button 120, and a display 125. According to other embodiments, user device 100 may comprise fewer components, additional components, different components, and/or a different arrangement of components than those illustrated in FIG. 1A and described herein. Additionally, user device 100 may take the form of a different configuration (e.g., a slider, a clamshell, a swivel, etc.) than the configuration illustrated in FIG. 1A.

Housing 105 comprises a structure to contain components of user device 100. For example, housing 105 may be formed from plastic, metal, or some other type of material. Housing 105 supports microphone 110, speaker 115, button 120, and display 125.

Microphone 110 is capable of transducing a sound wave to a corresponding electrical signal. For example, a user may speak into microphone 110 during a telephone call or to execute a voice command. Speaker 115 is capable of transducing an electrical signal to a corresponding sound wave. For example, a user may listen to music or listen to a calling party through speaker 115. Button 120 provides an input to user device 100. For example, button 120 may be used to perform one or multiple functions (e.g., turn on/turn off user device 100, etc.).

Figure 1B:
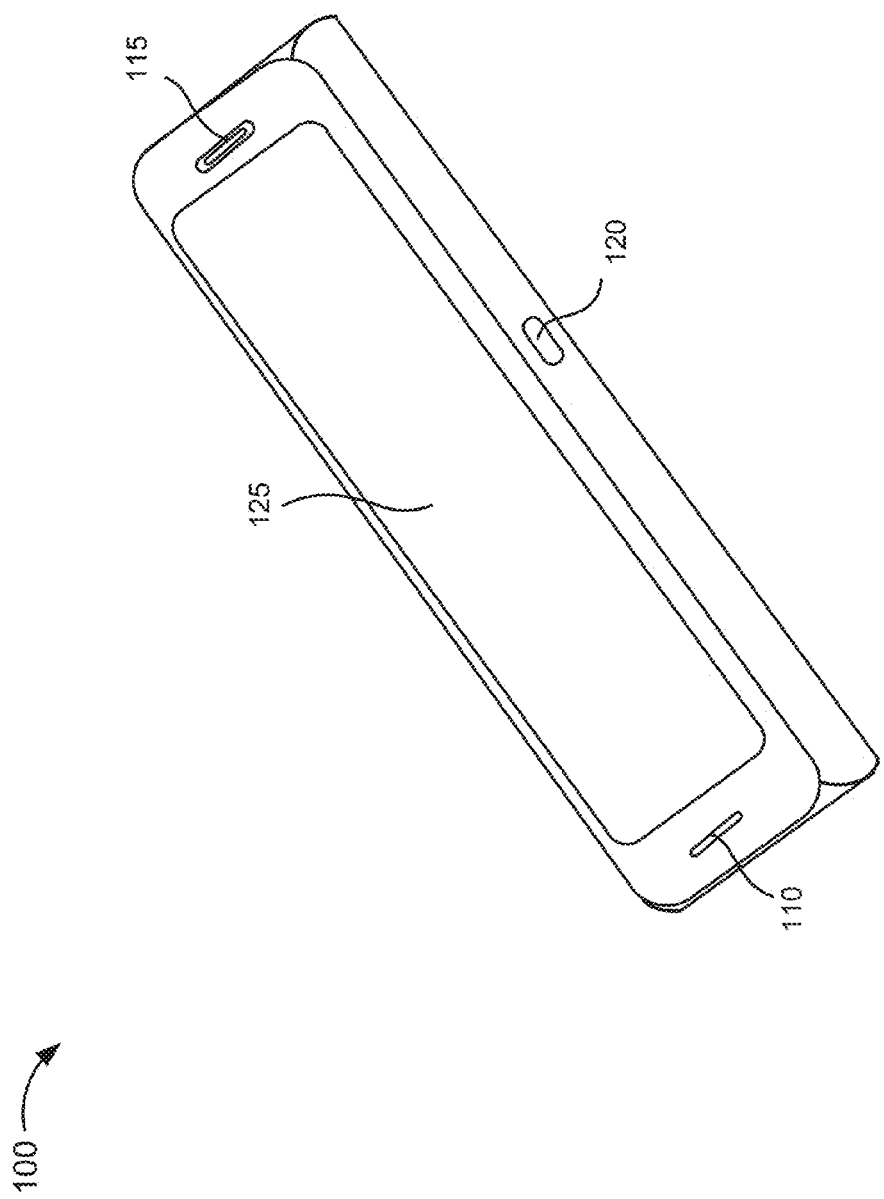
FIG. 1B is a diagram illustrating another view of the user device depicted in FIG. 1A.

Display 125 operates as an output component. For example, display 125 may comprise a liquid crystal display (LCD), a plasma display panel (PDP), a field emission display (FED), a thin film transistor (TFT) display, or some other type of display technology (e.g., OLED, active matrix OLED (AMOLED), etc). Display 125 is capable of displaying text, pictures, video, various images (e.g., icons, objects, etc.) that may be selected by a user to access various applications, enter data, and/or navigate, etc. Additionally, display 125 operates as an input component. For example, display 125 may comprise a touch-sensitive screen. Display 125 may be implemented using a variety of sensing technologies, including but not limited to, capacitive sensing, surface acoustic wave sensing, resistive sensing, optical sensing, pressure sensing, infrared sensing, or gesture sensing. In such instances, display 125 may correspond to a single-point input device (e.g., capable of sensing a single touch) or a multipoint input device (e.g., capable of sensing multiple touches that occur at the same time). Additionally, or alternatively, display 125 may comprise a touchless screen (e.g., having air-touch, air-gesture capabilities). FIG. 1B is diagram illustrating another view of user device 100.

Figure 2:
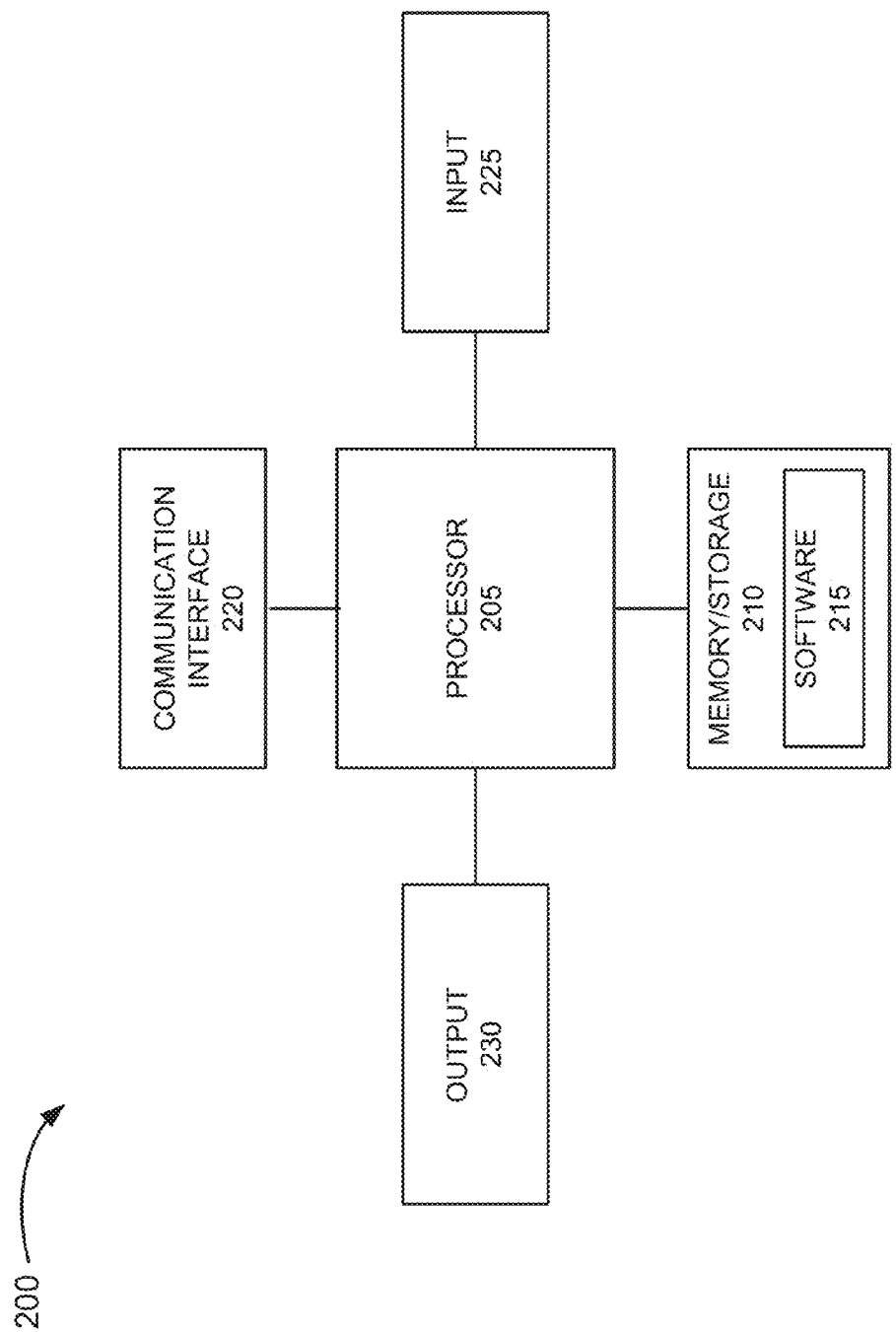
FIG. 2 is a diagram illustrating exemplary components of the user device.

FIG. 2 is a diagram illustrating exemplary components of user device 100. As illustrated, according to an exemplary embodiment, user device 100 includes a processor 205, memory/storage 210 that stores software 215, a communication interface 220, an input 225, and an output 230. According to other embodiments, user device 100 may include fewer components, additional components, different components, and/or a different arrangement of components than those illustrated in FIG. 2 and described herein.

Processor 205 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 205 may be implemented as hardware (e.g., a microprocessor, etc.), a combination of hardware and software (e.g., a SoC, an ASIC, etc.), may include one or multiple memories (e.g., cache, etc.), etc.

Processor 205 may control the overall operation or a portion of operation(s) performed by user device 100. Processor 205 may perform one or multiple operations based on an operating system and/or various applications or programs (e.g., software 215). Processor 205 may access instructions from memory/storage 210, from other components of user device 100, and/or from a source external to user device 100 (e.g., a network, another device, etc.).

Memory/storage 210 includes one or multiple memories and/or one or multiple other types of storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 210 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 210 may include drives for reading from and writing to the storage medium.

Memory/storage 210 may be external to and/or removable from device 200, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 210 may store data, software, an operating system, and/or instructions related to the operation of user device 100.

Software 215 includes an application or a computer program that provides a function and/or a process. Software 215 may include firmware. Software 215 includes an operating system (OS). For example, depending on the implementation of user device 100, the operating system may correspond to iOS, Android, Tizen, Blackbery, Windows Phone, or another type of operating system. According to an exemplary embodiment, user device 100 includes software 215, which when executed by processor 215, provides the functions of the locker tool, as described herein.

Communication interface 220 permits user device 100 to communicate with other devices, networks, systems, etc. Communication interface 220 may include one or multiple wireless interfaces and/or wired interfaces. Communication interface 220 may include one or multiple transmitters and receivers or transceivers. Communication interface 220 may operate according to a protocol and a communication standard.

Communication interface 220 may include a global positioning system (GPS) receiver. User device 100 may use other well-known methods to obtain or calculate its geographic location. A variety of technologies or techniques may be used to obtain positioning information, such as satellite positioning (e.g., Global Positioning System (GPS), Differential GPS (DGPS), Galileo, etc.), cellular positioning (e.g., triangulation, Enhanced Observed Time Difference (E-OTD), Uplink Time Difference of Arrival (U-TDOA), assisted GPS, etc.) and indoor positioning (e.g., Wireless Local Area Network (WLAN) positioning, Bluetooth positioning, IEEE 802.11 positioning, Ultra Wide Band (UWB) positioning, indoor positioning with GPS, etc.). These technologies may provide positioning information (e.g., geographic coordinates, etc.) with differing degrees of precision or accuracy. As described further below, geographic information may be used to support a locker service of user device 100. Additionally, communication interface 220 may identify whether user device 100 is connected to a particular network and/or another device. As described further below, connection information may be used to support a locker service of user device 100.

Input 225 permits an input into user device 100. For example, input 225 may include a keyboard, a mouse, a display, a touchscreen, a touchless screen, a button, a switch, an input port, speech recognition logic, and/or some other type of visual, auditory, tactile, etc., input component. Input 225 may include a compass, a gyroscope, an accelerometer, and/or a motion sensor. These components can provide motion information and/or direction information. As described further below, motion information and/or direction information may be used to support a locker service of user device 100.

Output 230 permits an output from user device 100. For example, output 230 may include a speaker, a display, a touchscreen, a touchless screen, a light, an output port, and/or some other type of visual, auditory, tactile, etc., output component.

User device 100 may perform a process and/or a function, as described herein, in response to processor 205 executing software 215 stored by memory/storage 210. By way of example, instructions may be read into memory/storage 210 from another memory/storage 210 (not shown) or read from another device (not shown) via communication interface 220. The instructions stored by memory/storage 210 may cause processor 205 to perform a process described herein. Alternatively, for example, according to other implementations, user device 100 may perform a process described herein based on the execution of hardware (processor 205, etc.).

According to an exemplary embodiment, the operating system of user device 100 includes the locker tool, as described herein. For example, the device management of the operating system includes the locker tool. A further description of an exemplary embodiment of the locker tool is described below.

Figure 3:
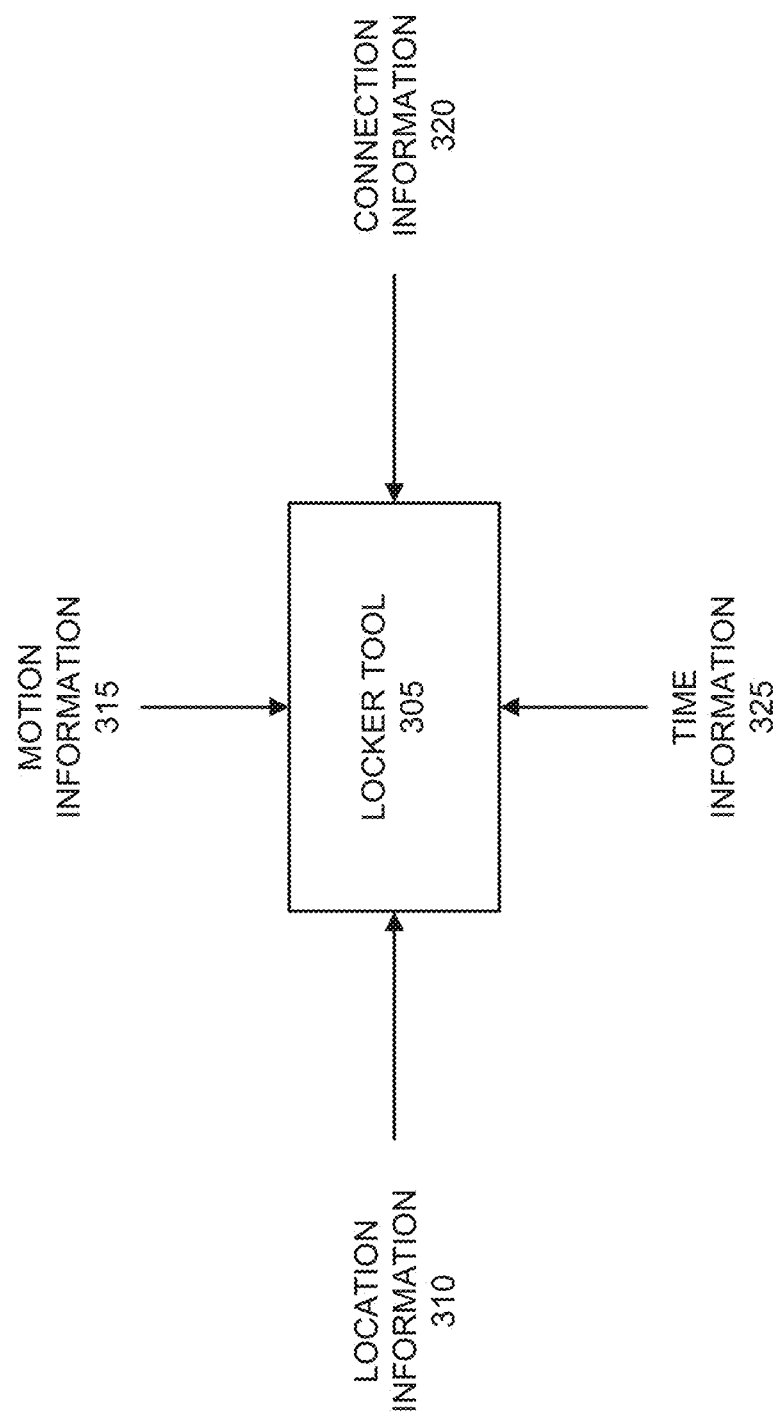
FIG. 3 is a diagram illustrating an exemplary locker tool of the user device.

FIG. 3 is a diagram illustrating an exemplary locker tool 305. As illustrated, locker tool 305 may obtain and use various types of information to control whether user device 100 is in a locked state. For example, locker tool 305 may obtain and use location information 310, motion information 315, connection information 320, and/or time information 325 to control whether user device 100 enters a locked state or remains in an unlocked state (e.g., a normal state, etc.). For example, locker tool 305 may monitor a current state pertaining to location information 310, motion information 315, connection information 320, and/or time information 325 and compare the current state to a locker setting stored by user device 100. Location information 310, motion information 315, connection information 315, and time information 325 are described further below.

Location information 310 may indicate a geographic location of user device 100. For example, location information 310 may indicate latitude and longitude coordinates and/or a point of interest (e.g., home, work, inside car, favorite restaurant, airport, or other public place, a cell identifier, etc.). Location information 310 may also include altitude information, accuracy information (e.g., pertaining to a geographic location), and/or other information pertaining to the geographic location. Location information 310 may indicate a distance from a particular location. For example, location information 310 may indicate that user device 100 is 10 meters from the user's desk at work. In this case, locker tool 305 may perform some calculations. For example, locker tool 305 may calculate a distance from a current location (e.g., 3 meters from the user's desk) relative to a source location (e.g., at the user's desk). Locker tool 305 may also use location information 310 to create a locker setting (e.g., to capture and store a longitude and a latitude belonging to particular place, such as work, home, etc.).

Motion information 315 may indicate a state of motion and a state of non-motion (e.g., motionless) of user device 100. For example, motion information 315 may indicate that user device 100 is moving at a certain speed, velocity, and/or acceleration. Motion information 315 may also indicate if user device 100 is at rest (i.e., motionless). Motion information 315 may indicate other information pertaining to motion (e.g., bearing, direction, etc.). Motion information 315 may also indicate a time period of motion and a time period of non-motion. For example, if a user of user device 100 picks up user device 100 from a desk and places user device 100 elsewhere on the desk, motion information 315 may indicate that five seconds of motion took place. Motion information 315 may indicate a type of motion. For example, motion information 315 may indicate that the type of motion of user device 100 corresponds to user device 100 carried by a user that is walking, a user that is running, a user that is riding in a car, a user that is bending over, etc. Depending on the data obtained from, for example, an accelerometer, a motion sensor, etc., as previously described in relation to input 225, locker tool 305 may include logic that processes motion information 315 received from these components, in order to provide the locker service, as described herein. For example, locker tool 305 may correlate time with motion information 315 to determine a duration of motion. Additionally, for example, locker tool 305 may determine degrees of motion (e.g., minimal, moderate, extreme) and/or types of motion (e.g., user running, etc.) based on motion information 315.

Connection information 320 may indicate information pertaining to a communicative link to a network and/or another device. For example, connection information 320 may indicate that user device 100 is connected to or not connected to a particular network (e.g., a user's work network, a user's home network, etc.). Also, for example, connection information 320 may indicate that user device 100 is connected to another user device or not connected to another user device. Connection information 320 may indicate the name of the network to which user device 100 is connected, the type of communicative link (e.g., WiFi, Bluetooth, near field communication (NFC), another wireless standard, etc.), a time period to which user device 100 is connected to a network or another user device, etc. Depending on the data obtained from, for example, communication interface 220, locker tool 305 may include logic that processes connection information 320 received from communication interface 220, in order to provide the locker service, as described herein. For example, the locker service may identify and use the state of one or multiple wireless connections (e.g., Bluetooth, NFC, ultra wide band (UWB), etc.) to determine whether to enter a locked state or not.

Time information 325 may indicate a time period of inactivity of a user of user device 100. Alternatively, time information 325 may indicate an instant in time. For example, time information 325 may indicate Monday through Friday (M-F) after 5:00 p.m. According to this example, user device 100 may enter a locked state when these instances of time occur. By way of another example, time information 325 may indicate a time period. For example, time information 325 may indicate 5:00 p.m. through 6:00 p.m. According to this example, user device 100 may enter a locked state during this time period. Locker tool 305 may use system time of user device 100 as a time referent to provide the locker service, as described herein.

Figure 4A:
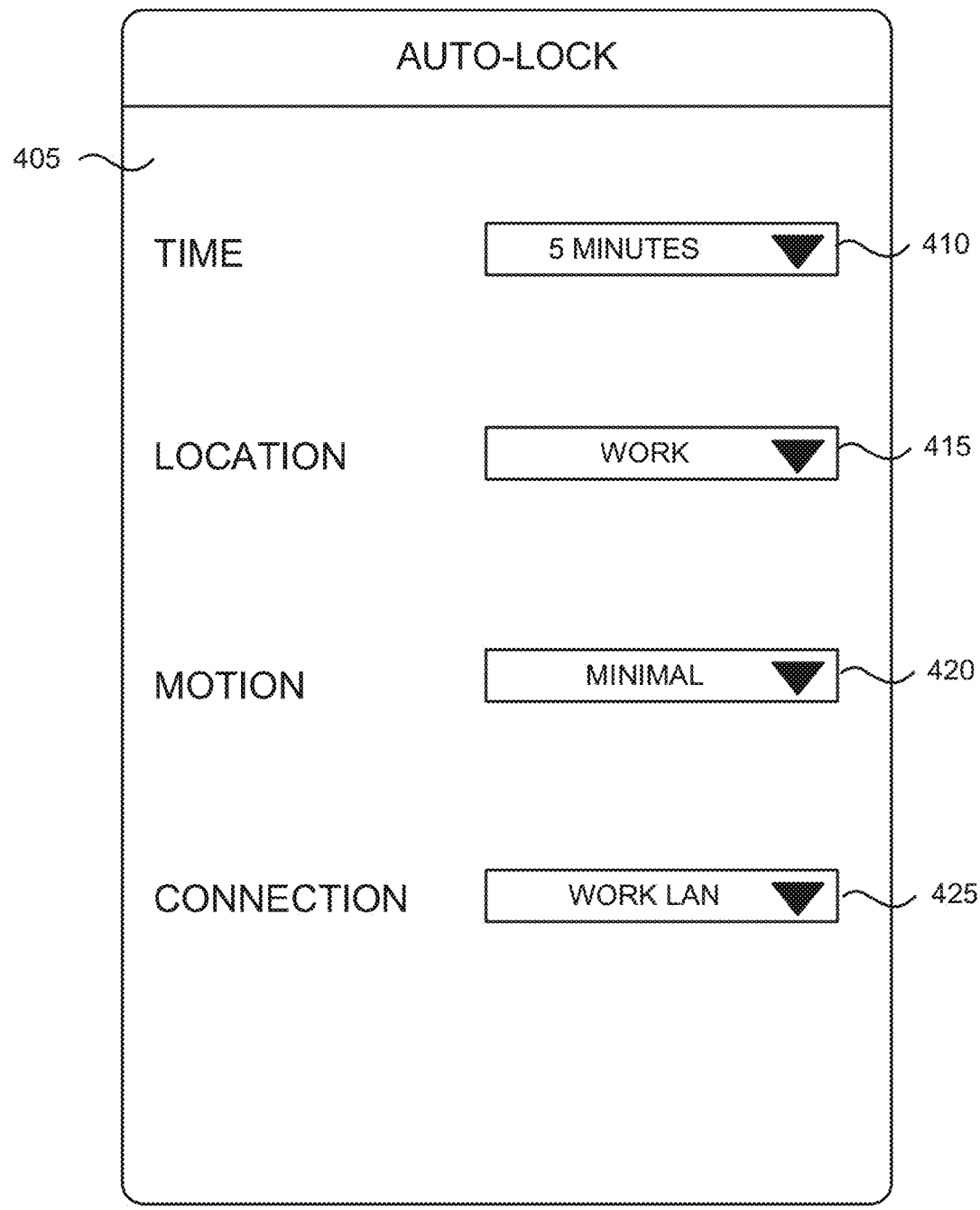
FIG. 4A and 4B are diagrams illustrating exemplary user interfaces pertaining to the locker tool.

Described below are some exemplary user interfaces of user device 100 that may be used to allow the user to configure a locker setting of locker tool 305. FIG. 4A is a diagram illustrating an exemplary user interface 405. As illustrated, user interface 405 includes a dropdown menu 410 pertaining to time information 325, a dropdown menu 415 pertaining to location, a dropdown menu 420 pertaining to motion, and a dropdown menu 425 pertaining to connection information 320. In this way, the user may create a customized setting depending on the selection of one or multiple menus and corresponding information (e.g., time, location, etc.). Depending on the implementation, the locker setting may be used by locker tool 305 to keep user device 100 from entering a locked state or cause user device 100 to enter a locked state.

According to an exemplary embodiment, dropdown menu 410 provides a selection of time periods. For example, dropdown menu 410 may provide selectable time periods such as "never," "1 minute," "2 minutes," "5 minutes," "10 minutes," etc. A selected time period indicates a time period of inactivity of user device 100. According to another exemplary embodiment, dropdown menu 410 provides a selection of times. For example, dropdown menu 410 may provide selectable times such as "Noon," "1:15 p.m.," "2:30 p.m.," etc. For example, a selected time may indicate a time in which user device 100 enters a locked state, or automatically enters a locked state after a period of inactivity.

According to an exemplary embodiment, dropdown menu 415 provides a selection of a location. For example, dropdown menu 415 may provide selectable locations such as "work," "home," "car," etc. According to an exemplary embodiment, the user is able to save certain locations (e.g., longitude and latitude coordinates) and name such locations. According to another example, the user may select a location outside of another location. For example, the user may select an "in-public" location, which may be identified as any location other than home and work. According to another exemplary embodiment, dropdown menu 415 provides a selection of distances from locations. For example, dropdown menu 415 may provide selectable locations such as "work desk and 5 meter radius" or "home and 15 meter radius."

According to an exemplary embodiment, dropdown menu 420 provides a selection of a motion or non-motion. For example, dropdown menu 420 may provide selections such as "no motion," "minimal," "moderate," "extreme," etc. By way of further example, "minimal" motion may correspond to the user picking up user device 100 or picking up user device 100 and placing user device 100 on a table or a desk. Additionally, for example, "moderate" motion may correspond to the user carrying user device 100 while walking. Additionally, for example, "extreme" motion may correspond to the user carrying user device 100 while running or the user driving with user device 100 (e.g., either on-person or on a seat) in a car. Depending on the desired effect, these degrees of motion may keep user device 100 from entering a locked state or cause user device 100 to enter a locked state. The "no motion" setting permits the user, for example, to leave user device 100 on a table, a desk, etc. If the user picks up or moves user device 100, user device 100 may enter a locked state.

According to another exemplary embodiment, dropdown menu 420 provides a selection of motions and corresponding durations. For example, dropdown menu 420 may provide selections, such as "minimal and 5 seconds," "moderate and 30 seconds," etc.

According to exemplary embodiment, dropdown menu 425 provides a selection of a connection between user device 100 and a network or another device (e.g., a user device). For example, dropdown menu 425 may provide selections such as "Home LAN," "Work LAN," "Work VPN," "XYZ Website," "Personal Smartphone," a device identified by a Media Access Control (MAC) address, an Internet Protocol (IP) address, an equipment identifier, etc. According to another exemplary embodiment, dropdown menu 425 provides a selection of a type of connection and the network or other device. For example, dropdown menu 425 may provide selections such as "Bluetooth and in-car infotainment device," "Work LAN without tethering," etc.

Figure 4B:
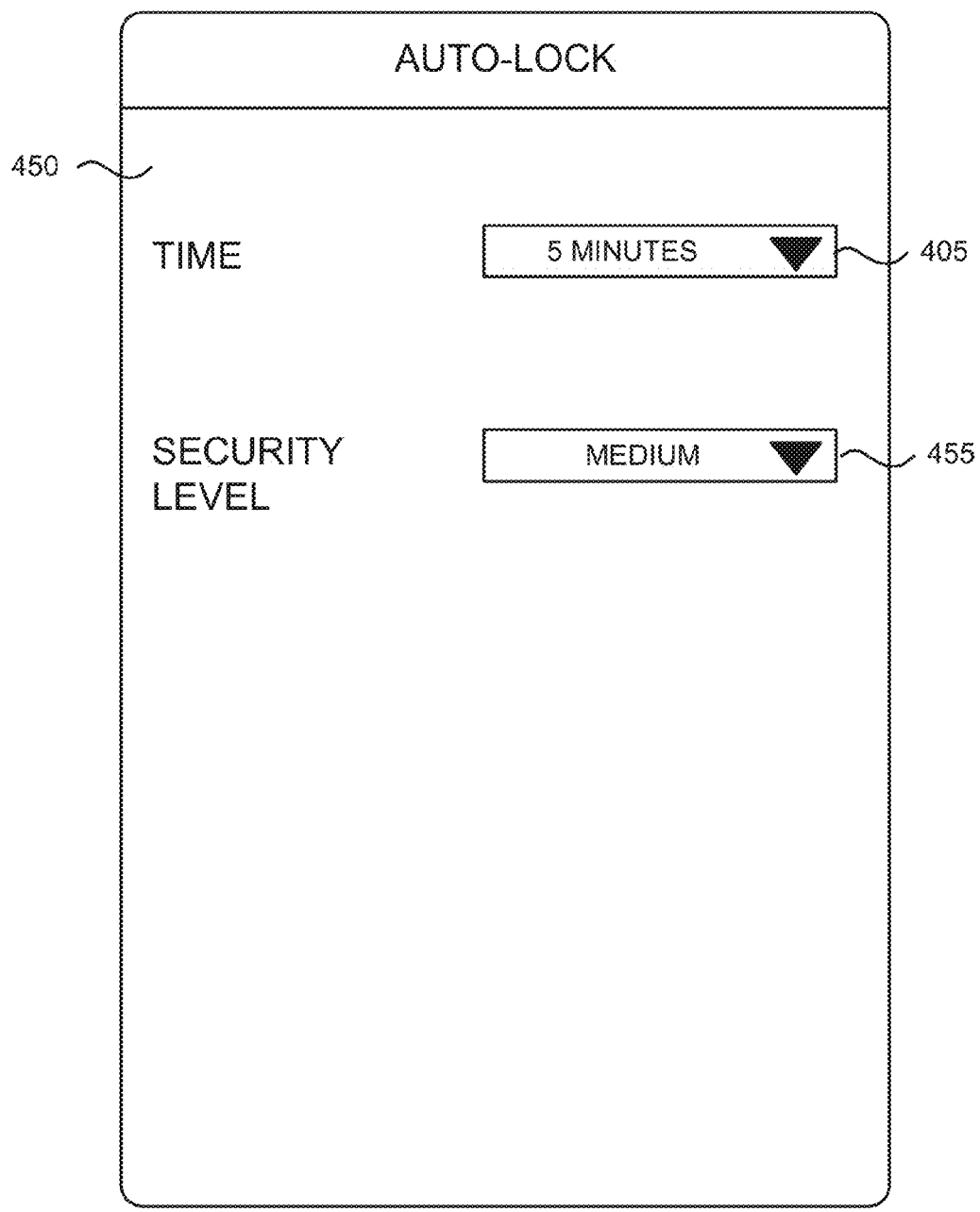

FIG. 4B is a diagram illustrating another exemplary user interface 450. As illustrated, user interface 450 includes dropdown menu 405, which has been previously described. Additionally, user interface 450 includes a dropdown menu 455. Dropdown menu 455 provides a selection of a security level. For example, dropdown menu 455 may provide selections such as "low," "medium," and "high." According to an exemplary implementation, each security level is based on time information 325, location information 310, motion information 315, and/or connection information 320. For example, a high security level may restrict motion, location, and time such that immediately following the user placing user device 100 down (e.g., on a desk, etc.), user device 100 enters a locked state. According to an exemplary implementation, user device 100 may be pre-configured with a mapping between a security level or policy and time, location, motion, and/or connection parameters. Alternatively, the user may select time, location, motion, and/or connection parameters and store them as a particular security level or customized policy. Locker tool 305 uses the settings pertaining to dropdown menu 405 and/or dropdown menu 455 to determine whether user device 100 enters a locked state. Depending on the implementation, the locker settings may be used to keep user device 100 from entering a locked state or cause user device 100 to enter a locked state.

Although user interfaces 405 and 450 include the dropdown menus described, according to other exemplary embodiments, user interfaces 405 and/or 450 may include additional, different, and/or fewer dropdown menus. For example, user interfaces 405 and/or 450 may include a date dropdown menu and/or a day dropdown menu. In this way, the user may schedule locked or unlocked states. For example, the user may configure locker settings on a day (e.g., Tuesday) or days basis (e.g., Monday through Friday). For example, the user may configure a locker setting for when the user is at work, and another locker setting when the user travels in his/her car or walks from his/her work to the subway and travels on the subway, etc. Additionally, although user interfaces 405 and 450 are described as using dropdown menus, according to other embodiments, user interfaces 405 and/or 450 may include different types of graphical elements (e.g., an icon, a menu bar, a tab, a button, a slider, a check box, etc.) to obtain the locker setting from the user. Also, although not illustrated, for example, user interfaces 405 and 450 may include user interfaces that allow the user to set a login (e.g., a passcode, etc.).

Figure 5B:
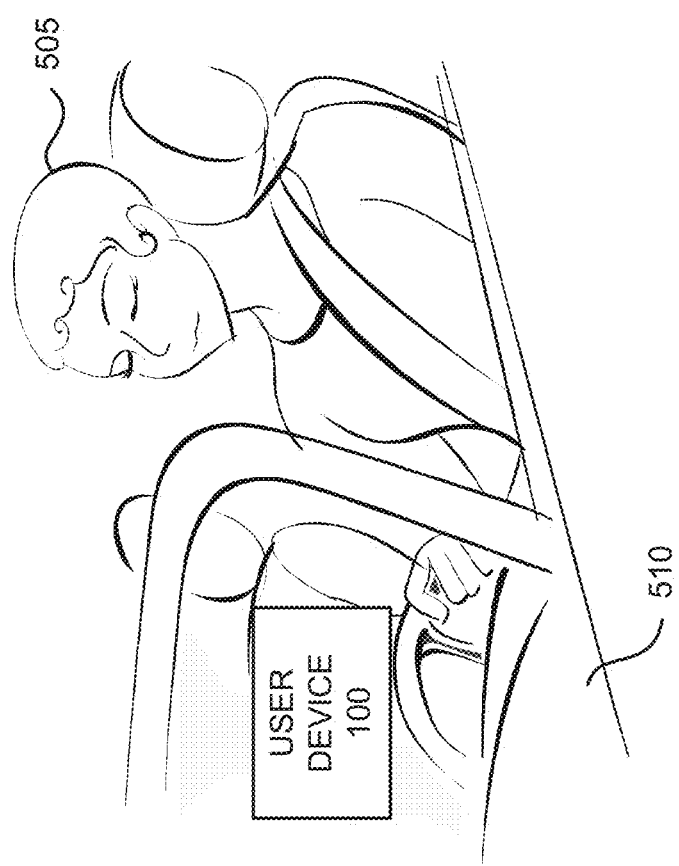
Figure 5C:
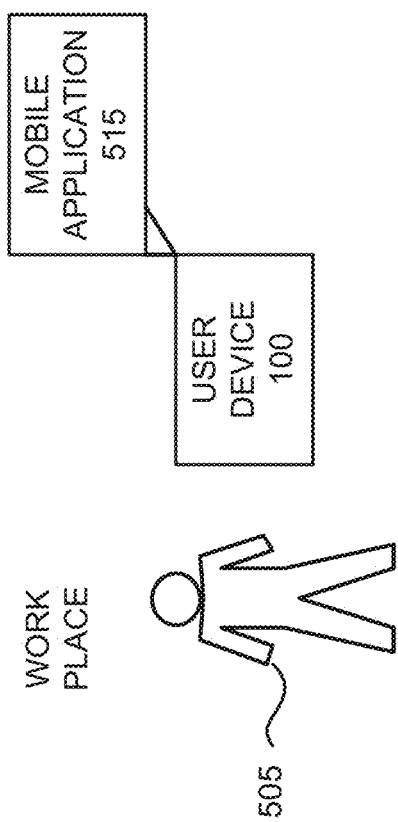

FIGS. 5A-5C are diagrams illustrating exemplary scenarios pertaining to the locker services of user device 100, as described herein. Referring to FIG. 5A, assume a user 505 has configured a locker setting on user device 100 in which user device 100 does not enter a locked state provided user device 100 remains connected to a work LAN 510 and user device 100 is located at the user's work place.

Referring to FIG. 5B, assume user 505 has configured a locker setting on user device 100 in which user device 100 does not enter a locked state provided user device 100 is connected (e.g., via a Bluetooth) to an infotainment system (not illustrated) of a car 510.

Referring to FIG. 5C, assume user 505 has configured a locker setting on user device 100 in which user device 100 does not enter a locked state provided user device 100 is located at a specified location (e.g., work). According to this example, a mobile application 515 of user device 100 uses the locker setting. For example, assume user device 100 is a work device and user 505 is working via mobile application 515 while at work. User 505 may initially enter login information to use mobile application 515, which is subsequently verified. In this case, assume user 505 is successfully logs in. User 505 leaves user device 100 at the work place, goes to lunch, and returns. According this example, when user 505 returns, mobile application 515 has not entered a locked state. For example, mobile application 515 may use the locker service of user device 100 to determine whether to enter the locked state. Although FIGS. 5A-5C illustrate an exemplary embodiment of the locker service, in relation to distinct scenarios, according to other scenarios, other types of processes may be performed.

Figure 6A:
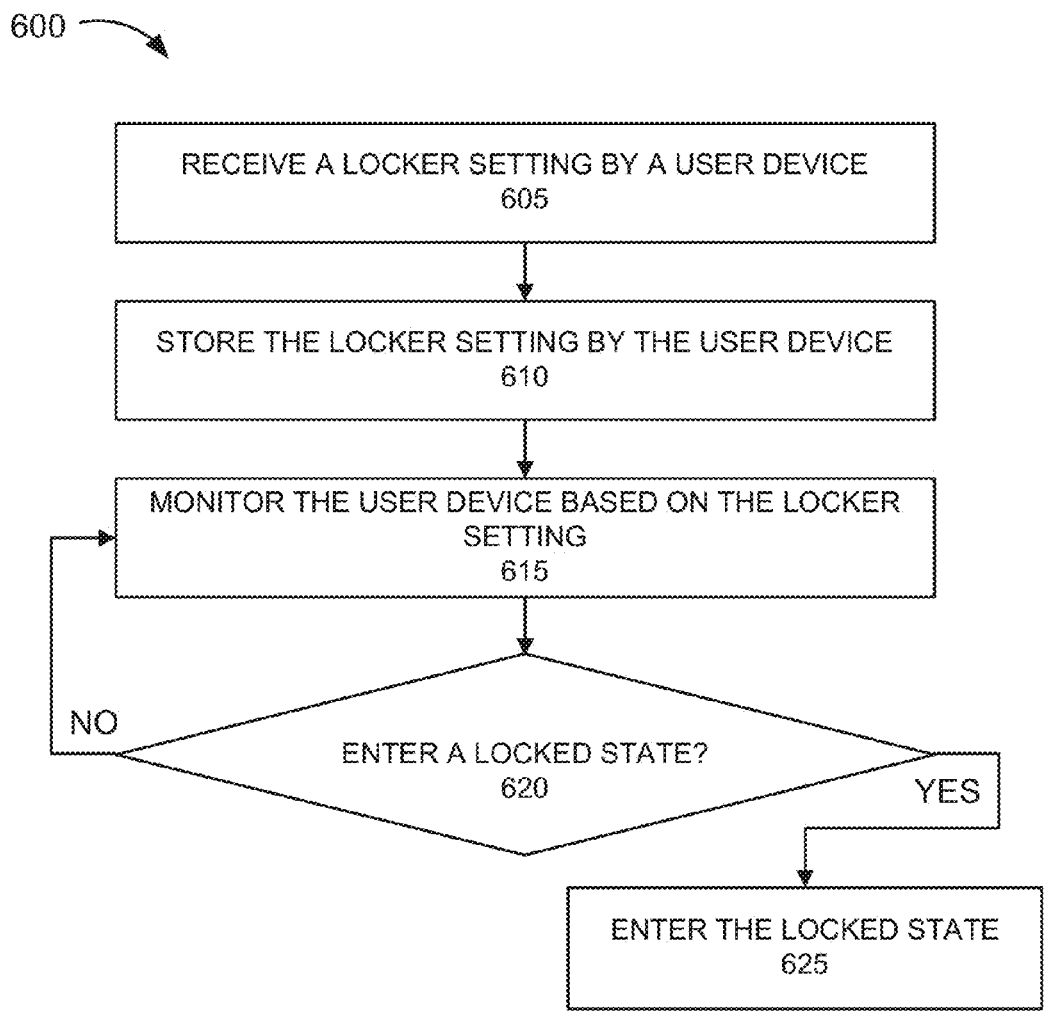
FIGS. 6A and 6B are flow diagrams that illustrate exemplary processes pertaining to an exemplary embodiment of the locker tool.

FIG. 6A is a flow diagram illustrating an exemplary process 600 pertaining to an exemplary embodiment of the locker service. Process 600 is directed to a process previously described above with respect to FIGS. 5A-5C and elsewhere in this description, in which locker tool 305 uses a locker setting to provide the locker service. According to an exemplary embodiment, user device 100 performs one or more of the steps described in process 600. For example, processor 205 may execute software 215 to perform the step described. By way of further example, processor 205 executes locker tool 305, which is implemented as software 215. Process 600 illustrate a process of locker tool 305 in which, if the locker setting is matched by the current state of user device 100, then user device 100 does not enter a locked state.

Referring to FIG. 6A, process 600 begins, in block 605, by receiving a locker setting. For example, a user configures locker tool 305 via a user interface (e.g., user interface 405, user interface 450, or some other user interface). The locker setting may include, in addition to, or instead of, location information 310, motion information 315, and/or connection information 320. In block 610, the locker setting is stored. For example, user device 100 stores the locker setting in memory/storage 210. Subsequently, it may be assumed that the user operates user device 100 (e.g., user device 100 is operating in a normal state).

In block 615, the user device monitors itself based on the stored locker setting. For example, locker tool 305 receives location information 310, motion information 315, connection information 320, and/or time information 325 from various components of user device 100. By way of example, communication information 220 may provide location information 310 and/or connection information 320 to locker tool 305. Additionally, for example, as previously described, input 225 may include an accelerometer, a motion detector, etc., from which motion information 315 is obtained and provided to locker tool 305. Locker tool 305 may also obtain time information 325 from the operating system.

In block 620, it is determined whether to enter a locked state. For example, locker tool 305 compares a locker setting to current location information 310, motion information 315, connection information, and/or time information 325. Based on the comparison, locker tool 305 determines whether to enter a locked state. If it is determined to not enter a locked state (block 620-NO), then process 600 continues to block 615. That is, locker tool 305 continues to monitor the current state of user device 100 according to parameters of the locker setting. This may result when the current location information 310, motion information 315, connection information 320, and/or time information 325 match the locker setting. By way example, if the locker setting indicates that when user device 100 is connected to a work LAN and user device 100 is located in the work place (e.g., as previously described in relation to FIG. 5A), then locker tool 305 determines to not enter a locked state. Thus, for example, if current location information 310 and connection information 320 indicates that user device 100 is currently at the work place and connected to the work LAN. Conversely, if it is determined to enter a locked state (block 620-YES), then locker tool 305 causes user device 100 to enter the locked state (block 625). Following the same example, if user device 100 is no longer located at the work place and/or connected to the work LAN, locker tool 305 causes user device 100 to enter the locked state. Thus, for example, if current location information 310 and connection information 320 indicate that user device 100 is located in a parking lot of the work place and a connection to the work LAN does not exist, locker tool 305 will cause user device to enter the locked state. In this case, the user will have to provide a login (e.g., a passcode, etc.) to unlock user device 100. According to some implementations, if the user initially enters login information to use user device 100, when user device 100 subsequently enters the locked state, the user provides a login. This may be considered as re-entering login information. When in the locked state, when the user wishes to use user device 100, user device 100 may display a prompt (e.g., via a user interface) to the user so that the user can enter login information. The login information may include one or multiple instances of authentication information pertaining to the user.

Although FIG. 6A illustrates an exemplary locker service process 600, according to other embodiments, process 600 may include additional operations, fewer operations, and/or different operations than those illustrated in FIG. 6A and described. For example, as previously described, the entrance or non-entrance into a locked state may pertain to user device 100, one or multiple applications, or a combination thereof.

Figure 6B:
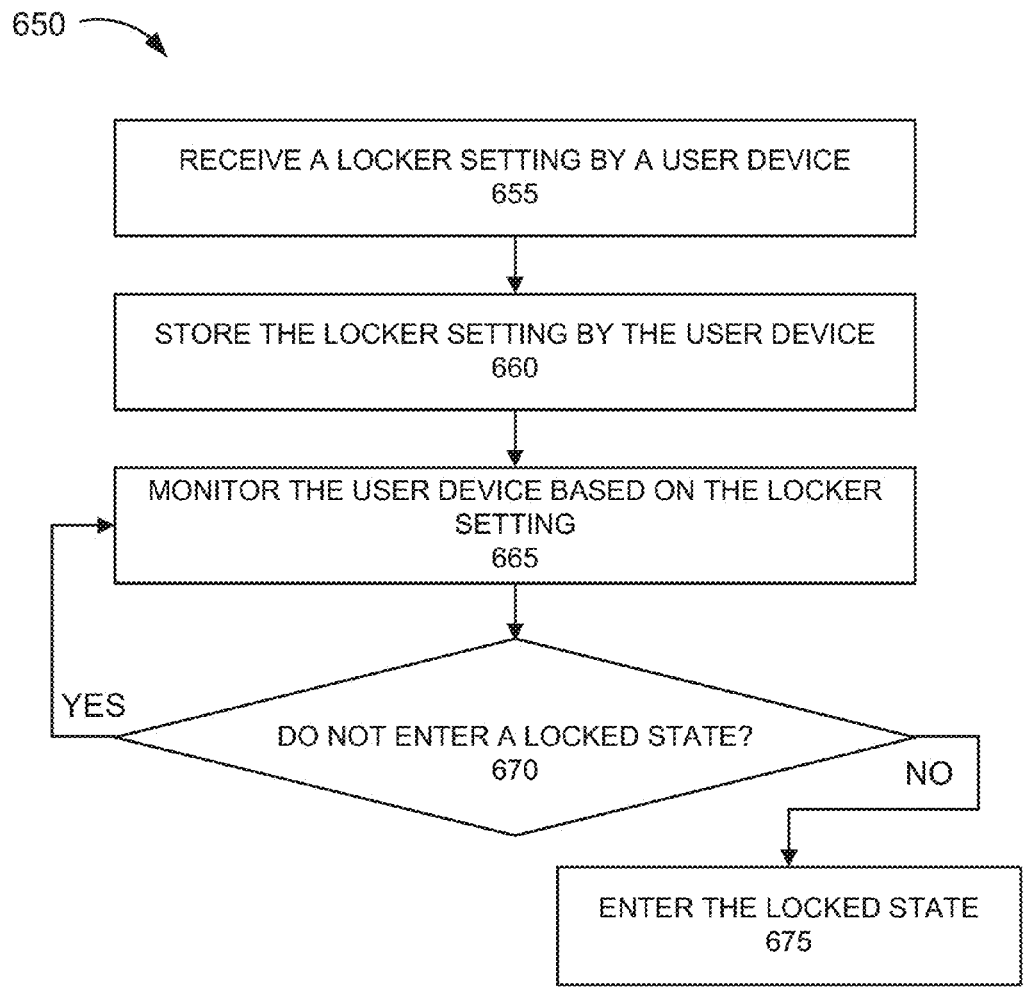

FIG. 6B is a flow diagram illustrating an exemplary process 650 pertaining to an exemplary embodiment of the locker service. According to an exemplary embodiment, user device 100 performs one or more of the steps described in process 650. For example, processor 205 may execute software 215 to perform the step described. By way of further example, processor 205 executes locker tool 305. Process 650 illustrate a process of locker tool 305 in which, if the locker setting does not match the current state of user device 100, then user device 100 enters a locked state. Since blocks 655, 660, and 665 of process 650 are similar in nature to blocks 605, 610, and 615 of process 600, blocks 655, 660, and 665 will not be described again, for the sake of brevity. Referring to FIG. 6B, in block 670, it is determined whether to not enter a locked state. For example, locker tool 305 compares a locker setting to current location information 310, motion information 315, connection information 320, and/or time information 325. Based on the comparison, locker tool 305 determines whether to not enter a locked state. If it is determined to not enter a locked state (block 670-YES), then process 650 continues to block 665. That is, locker tool 305 continues to monitor the current state of user device 100 according to parameters of the locker setting. This may result when the current location information 310, motion information 315, connection information, and/or time information 325 do not match the locker setting. By way example, if the locker setting indicates that when user device 100 is motionless and user device 100 is located in the work place (e.g., as previously described in relation to FIG. 5A), then locker tool 305 determines to enter a locked state. Thus, for example, if current location information 310 and motion information 315 indicate that the user is carrying user device 100 and/or using user device 100 at the work place, locker tool 305 will not cause user device 100 to enter the locked state. Conversely, if it is determined to enter a locked state (block 670-NO), then locker tool 305 causes user device 100 to enter the locked state (block 675). Following the same example, if current location information 310 and motion information 315 indicate that user device 100 is motionless on the user's desk, locker tool 305 causes user device 100 to enter a locked state. In this case, the user will have to provide a login (e.g., a passcode, etc.) to unlock user device 100. The login may include one or multiple instances of authentication information pertaining to the user.

Although FIG. 6B illustrates an exemplary locker service process 650, according to other embodiments, process 650 may include additional operations, fewer operations, and/or different operations than those illustrated in FIG. 6B and described. For example, as previously described, the entrance or non-entrance into a locked state may pertain to user device 100, one or multiple applications, or a combination thereof.

While processes 600 and 650 have been described in a manner in which user device 100 enters or does not enter a locked state, according to other embodiments, mobile applications of user device 100 may operate in a similar manner, as previously described. For example, a mobile application of user device 100 may use functionality of locker tool 305 to determine whether to enter or not enter a locked state. In this way, a user may configure one or multiple applications resident on user device 100 to enter or not enter a locked state regardless of the state of user device 100. For example, user device 100 may be in an unlocked state, while an email application may enter a locked state. As previously described, a mobile application may use a locker setting as a basis to enter or not enter a locked state.

Additionally, in view of processes 600 and 650, the locker setting may have different meaning. That is, when the current state of user device 100 matches the locker setting, this could mean that user device 100 enters a locked state or does not. According to an exemplary embodiment, user device 100 may operate according to either process 600 or process 650. According to other embodiments, user device 100 may operate according to both processes. In that case, for example, the user interface (e.g., user interface 405, user interface 450) may include an additional graphical element to allow the user to indicate which process to perform. For example, the user interface may include a check box, which if checked, means when the current state of user device 100 matches the locker setting, user device 100 enters a locked state. Consequently, the converse would apply, if the check box is unchecked (i.e., a match would cause user device 100 to not enter a locked state).

The foregoing description of embodiments provides illustration, but is not intended to be exhaustive or to limit the embodiments to the precise form disclosed. Accordingly, modifications to the embodiments described herein may be possible. For example, as previously described, the locker tool may monitor the current state of the user device and compare the current state of the user device to the locker setting. Of course, such a process assumes that the user device is operating in a state that allows such a monitoring and/or allows for the other components of the user device to obtain certain types of information (e.g., location, motion, etc.). In this regard, the process of monitoring the state of the user device may not always be continuous. For example, assume the user device enters a sleep mode, a hibernate mode, or some other type of mode that prevents or overrides the locker service or the acquisition of information that supports the locker service. Regardless of such a situation, the locker tool may still be able to provide the locker service. For example, assume the locker setting is based on motion and/or location information. The user device enters a sleep mode, which prevents the locker tool to continuously monitor the location and motion of the user device. Subsequently, however, the user device wakes. The locker service may now obtain location information and motion information, and determine whether to enter the locked state.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 6A and 6B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 205, etc.), or a combination of hardware and software (e.g., software 215). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 205) of a computational device. A non-transitory storage medium includes one or more of the storage mediums described in relation to memory/storage 210.

No element, act, or instruction described in the present application should be construed as critical or essential to the embodiments described herein unless explicitly described as such.

What is claimed is:

1. A method comprising:
   receiving, by a user device and via a graphical user interface, a locker setting from a user, wherein the locker setting indicates at least one of a geographic location of the user device, a state of motion of the user device, or a state of connection of the user device relative to a network or another device, and wherein the locker setting indicates that the user device is to enter a locked state or an unlocked state when a current state of the user device matches the locker setting;
   storing, by the user device, the locker setting;
   executing, by the user device, an end user application while the user device is in the unlocked state, wherein the end user application uses the locker setting to govern whether to enter an application locked state or an application unlocked state, and while executing, the end user application operates in the application unlocked state;
   monitoring, by the user device, the current state of the user device, wherein the current state corresponds to at least one of a current geographic location, a current state of motion, or a current state of connection of the user device;
   comparing, by the user device and based on the monitoring, the current state to the locker setting while the user device is in the unlocked state and the end user application is executing;
   determining, by the user device and based on the comparing, whether to enter the locked state or remain in the unlocked state;
   determining, by the end user application and based on the comparing, whether to enter the application locked state or remain in the application unlocked state;
   entering, by the user device, the locked state in response to determining that the user device is to enter the locked state, wherein when in the locked state, the user has to enter login information to unlock the user device, and remaining, by the end user application, in the application unlocked state in response to determining that the end user application is to remain in the application unlocked state; and
   remaining, by the user device, in the unlocked state in response to determining that the user device is to remain in the unlocked state, and entering, by the end user application, the application locked state in response to determining that the end user application is to enter the application locked state.

2. The method of claim 1, wherein the locker setting indicates a period of inactivity of the user of the user device, and the method further comprising:
   monitoring, by the user device, the current state of the user device, wherein the current state includes a current period of inactivity of the user of the user device; and
   comparing, by the user device, the current state to the locker setting.

3. The method of claim 1, wherein the comparing comprises:
   determining that the current state matches the locker setting.

4. The method of claim 1, wherein the comparing comprises:
   determining that the current state does not match the locker setting.

5. The method of claim 1,
   wherein when in the application locked state, the user has to enter login information to unlock the end user application.

6. The method of claim 1, wherein the user device is a mobile device.

7. The method of claim 1, wherein the state of motion indicates a type of motion or a degree of motion, and the method further comprising:
   prompting, by the user device and via another graphical user interface, the user to enter the login information subsequent to entering the locked state.

8. A mobile device comprising:
   a communication interface;
   a memory, wherein the memory stores instructions; and
   a processor, wherein the processor executes the instructions to:
   receive a locker setting via a graphical user interface, from a user, wherein the locker setting indicates at least one of a geographic location of the mobile device, a state of motion of the mobile device, or a state of connection of the mobile device relative to a network or another device, and wherein the locker setting indicates that the mobile device is to enter a locked state or an unlocked state when a current state of the mobile device matches the locker setting;
   store the locker setting;
   execute a mobile device application while the mobile device is in the unlocked state, wherein the mobile device application uses the locker setting to govern whether to enter an application locked state or an application unlocked state, and while executing, the mobile device application operates in the application unlocked state;
   monitor the current state of the mobile device, wherein the current state corresponds to at least one of a current geographic location, a current state of motion, or a current state of connection of the mobile device;
   compare the current state to the locker setting while the mobile device is in the unlocked state and the mobile device application is executing, based on the monitorship;
   determine whether to enter the locked state or remain in the unlocked state based on the comparison;
   determine whether to enter the application locked state or remain in the application unlocked state based on the comparison;
   enter the locked state in response to a determination that the mobile device is to enter the locked state, wherein when in the locked state, the user has to enter login information to unlock the user device, and remain in the application unlocked state in response to a determination that the mobile device application is to remain in the application unlocked state; and remain in the unlocked state in response to a determination that the mobile device is to remain in the unlocked state, and enter the application locked state in response to a determination that the mobile device application is to enter the application locked state.

9. The mobile device of claim 8, wherein the locker setting indicates a period of inactivity of the user of the mobile device, and wherein the processor further executes the instructions to:
monitor the current state of the mobile device, wherein the current state includes a current period of inactivity of the user of the mobile device; and
compare the current state to the locker setting.

10. The mobile device of claim 8, wherein, when comparing, the processor further executes the instructions to:
determine that the current state matches the locker setting.

11. The mobile device of claim 8, wherein the locker setting indicates the geographic location of the mobile device, the geographic location indicating a first location, the processor further executes the instructions to:
store a second location, wherein the second location includes at least one of a home of the user or a work place of the user, and the second location is different than the first location; and
identify whether the mobile device is at the first location based on whether the mobile device is not at the second location.

12. The mobile device of claim 8, wherein, wherein comparing, the processor further executes the instructions to:
determine that the current state does not match the locker setting.

13. The mobile device of claim 8, wherein the locker setting includes the current state of motion, the current state of motion including a type of motion and a duration of motion, and the mobile device further comprising:
at least one of a motion sensor, a gyroscope, or an accelerometer, wherein the processor further executes the instructions to:
determine a current type of motion; and
determine a current duration of motion.

14. The mobile device of claim 8, wherein the processor further executes the instructions to:
receive a request from the user to execute the mobile device application; and
prompt the user for login information in response to the receipt of the request.

15. The mobile device of claim 8, wherein the processor further executes the instructions to:
prompt the user for login information in response to the entrance of the mobile device application in the application locked state.

16. A non-transitory, computer-readable storage medium storing instructions executable by a processor of a computational device, which when executed cause the computational device to:
receive a locker setting via a graphical user interface, from a user, wherein the locker setting indicates at least one of a geographic location of the computational device, a state of motion of the computational device, or a state of connection of the computational device relative to a network or another device, and wherein the locker setting indicates that the computational device is to enter a locked state or an unlocked state when a current state of the computational device matches the locker setting;
store the locker setting;
execute an end user application while the computational device is in the unlocked state, wherein the end user application uses the locker setting to govern whether to enter an application locked state or an application unlocked state, and while executing. the end user application operates in the application unlocked state;
monitor the current state of the computational device, wherein the current state corresponds to at least one of a current geographic location, a current state of motion, or a current state of connection of the computational device;
compare the current state to the locker setting while the computational device is in the unlocked state and the end user application is executing, based on the monitorship;
determine whether to enter the locked state or remain in the unlocked state based on the comparison;
determine whether to enter the application locked state or remain in the application unlocked state based on the comparison;
enter the locked state in response to a determination that the computational device is to enter the locked state, wherein when in the locked state, the user has to enter login information to unlock the computational device, and remain in the application unlocked state in response to a determination that the end user application is to remain in the application unlocked state; and
remain in the unlocked state in response to a determination that the computational device is to remain in the unlocked state, and enter the application locked state in response to a determination that the end user application is to enter the application locked state.

17. The non-transitory, computer-readable storage medium of claim 16, wherein the locker setting indicates the geographic location of the computational device, the geographic location indicating a first location, and further storing instructions executable by the processor of the computational device, which when executed cause the computational device to:
store a second location, wherein the second location includes at least one of a home of the user or a work place of the user, and the second location is different than the first location; and
identify whether the computational device is at the first location based on whether the computational device is not at the second location.

18. The non-transitory, computer-readable storage medium of claim 16, further storing instructions executable by the processor of the computational device, which when executed cause the computational device to:
receive a request from the user to execute the end user application; and
prompt the user for login information in response to the receipt of the request.

19. The non-transitory, computer-readable storage medium of claim 16, further storing instructions executable by the processor of the computational device, which when executed cause the computational device to:
prompt the user for login information in response to the entrance of the end user application in the application locked state.

20. The non-transitory, computer-readable storage medium of claim 16, further storing instructions executable by the processor of the computational device, which when executed cause the computational device to:

calculate a duration of motion of the computational device, wherein the computational device is a mobile device.

\* \* \* \* \*